(12) United States Patent
Wilson

(10) Patent No.: US 9,964,624 B2
(45) Date of Patent: May 8, 2018

(54) COMPUTER VISION-BASED OBJECT TRACKING SYSTEM

(71) Applicant: Microsoft Technology Licensing, LLC, Redmond, WA (US)

(72) Inventor: Andrew D. Wilson, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 377 days.

(21) Appl. No.: 14/334,846

(22) Filed: Jul. 18, 2014

(65) Prior Publication Data

US 2014/0327784 A1    Nov. 6, 2014

Related U.S. Application Data

(63) Continuation of application No. 11/439,453, filed on May 23, 2006, now Pat. No. 8,803,978.

(51) Int. Cl.
| | |
|---|---|
| H04N 5/225 | (2006.01) |
| G01S 3/786 | (2006.01) |
| H04N 3/14 | (2006.01) |
| H04N 5/345 | (2011.01) |
| H04N 5/33 | (2006.01) |
| H04N 5/374 | (2011.01) |

(Continued)

(52) U.S. Cl.
CPC ............ *G01S 3/7864* (2013.01); *G06T 7/246* (2017.01); *H04N 3/155* (2013.01); *H04N 5/33* (2013.01); *H04N 5/3454* (2013.01); *H04N 5/374* (2013.01); *G06K 2009/3291* (2013.01); *G06T 2207/30241* (2013.01)

(58) Field of Classification Search
CPC ..................................................... H04N 5/374
See application file for complete search history.

(56) References Cited

U.S. PATENT DOCUMENTS

| | | |
|---|---|---|
| 5,164,585 A | 11/1992 | Lieu |
| 5,297,061 A | 3/1994 | Dementhon et al. |

(Continued)

FOREIGN PATENT DOCUMENTS

| | | |
|---|---|---|
| WO | WO 0101685 A1 | 1/2001 |
| WO | WO 0114955 A1 | 3/2001 |

OTHER PUBLICATIONS

Agarawala, Anand; "Super Skewer: A 3D input device based on infrared LEDs that are tracked by multiple cameras." Project Proposal. http://pages.cpsc.ucalgary.ca/~anand/cpsc502/03-Project_Proposal.htm, pp. 1-6.

(Continued)

*Primary Examiner* — Tracy Y Li
(74) *Attorney, Agent, or Firm* — Christopher J. Volkmann; Kelly, Holt & Christenson, PLLC

(57) ABSTRACT

A computer-implemented method for utilizing a camera device to track an object is presented. As part of the method, a region of interest is determined within an overall image sensing area. A point light source is then tracked within the region of interest. In a particular arrangement, the camera device incorporates CMOS image sensor technology and the point light source is an IR LED. Other embodiments pertain to manipulations of the region of interest to accommodate changes to the status of the point light source.

20 Claims, 4 Drawing Sheets

(51) Int. Cl.
*G06T 7/246* (2017.01)
*G06K 9/32* (2006.01)

(56) References Cited

U.S. PATENT DOCUMENTS

| | | | |
|---|---|---|---|
| 5,604,999 | A | 2/1997 | Barker |
| 5,610,653 | A | 3/1997 | Abecassis |
| 5,945,981 | A | 8/1999 | Paull et al. |
| 6,437,819 | B1 | 8/2002 | Loveland |
| 6,553,682 | B1 | 4/2003 | Willoughby |
| 6,677,941 | B2 | 1/2004 | Lin |
| 6,801,637 | B2 | 10/2004 | Voronka et al. |
| 6,944,317 | B2 | 9/2005 | Pavlovic et al. |
| 7,664,292 | B2 | 2/2010 | van den Bergen et al. |
| 8,803,978 | B2 | 8/2014 | Wilson |
| 2001/0019357 | A1 | 9/2001 | Ito et al. |
| 2003/0003925 | A1 | 1/2003 | Suzuki |
| 2003/0037075 | A1* | 2/2003 | Hannigan .............. G06Q 30/02 715/201 |
| 2003/0095186 | A1 | 5/2003 | Aman et al. |
| 2003/0169339 | A1* | 9/2003 | Allen .................... G01S 3/7864 348/169 |
| 2003/0197790 | A1 | 10/2003 | Bae |
| 2003/0201380 | A1 | 10/2003 | Ockerse et al. |
| 2004/0041912 | A1 | 3/2004 | Zeng |
| 2006/0007344 | A1* | 1/2006 | Neufeld ............... H04N 5/2251 348/336 |
| 2006/0043188 | A1 | 3/2006 | Kricorissian |
| 2006/0152489 | A1* | 7/2006 | Sweetser ............... G06F 3/0346 345/158 |
| 2006/0245649 | A1 | 11/2006 | Chen et al. |
| 2007/0265075 | A1* | 11/2007 | Zalewski ................ A63F 13/06 463/36 |

OTHER PUBLICATIONS

Student Paper: Munich, Mario E.; "Visual Input for Pen-Based Computers", http://www.vision.caltech.edu/mariomu/research/pentrack, pp. 1-3.

Prosecution History from U.S. Appl. No. 11/439,453, including: Issue Notification dated Jul. 23, 2014, Notice of Allowance dated Apr. 9, 2014, Amendment dated Feb. 18, 2014, Non-Final Office Action dated Nov. 13, 2013, Amendment with RCE dated Oct. 15, 2013, Final Office Action dated Aug. 20, 2013, Amendment dated Aug. 2, 2013, Non-Final Office Action dated May 2, 2013, Amendment with RCE dated Nov. 26, 2012, Final Office Action dated Oct. 26, 2012. Part 1 of 2.

Prosecution History from U.S. Appl. No. 11/439,453, including: Amendment dated Sep. 4, 2012, Non-Final Office Action dated Jul. 27, 2012, Amendment with RCE dated Mar. 23, 2011, Final Office Action dated Jan. 31, 2011, Amendment dated Nov. 19, 2010, Non-Final Office Action dated Oct. 5, 2010, and Application filed May 23, 2006. 185 pages. Part 2 of 2.

* cited by examiner

COMPUTER VISION-BASED OBJECT TRACKING SYSTEM

CROSS-REFERENCE TO RELATED APPLICATION

The present application is a continuation of and claims priority of U.S. patent application Ser. No. 11/439,453, filed May 23, 2006, the content of which is hereby incorporated by reference in its entirety.

BACKGROUND

When tracking an object using computer vision techniques, it can be desirable to place an active light emitting diode (LED) on the object to be tracked. Thus, the object can be tracked by tracking corresponding characteristics of the light source. This simplifies the image-processing task of finding the object in an image. It also reduces or eliminates ambiguity in terms of determining which object in an image is the object to be tracked. The tracking process can be simplified even further by using infrared (IR) LEDs and IR-sensitive cameras. In this case, the IR LED may be the only item visible in the scene.

Currently, the effectiveness of tracking an object by tracking an associated light source is limited because cameras are limited to a relatively low frame acquisition rate, such as a rate in the range of 30-60 Hz. Thus, such systems are generally unable to capture large or quick motions. Further, such systems typically exhibit high latency (latency is bounded by frame rate). Applications that might involve large and/or quick movements such as, but not limited to, music synthesis and video game controllers would benefit from higher frame rates.

The discussion above is merely provided for general background information and is not intended for use as an aid in determining the scope of the claimed subject matter.

SUMMARY

A computer-implemented method for utilizing a camera device to track an object is presented. As part of the method, a region of interest is determined within an overall image sensing area. A point light source is then tracked within the region of interest. In a particular arrangement, the camera device incorporates CMOS image sensor technology and the point light source is an IR LED. Other embodiments pertain to manipulations of the region of interest to accommodate changes to the status of the point light source.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
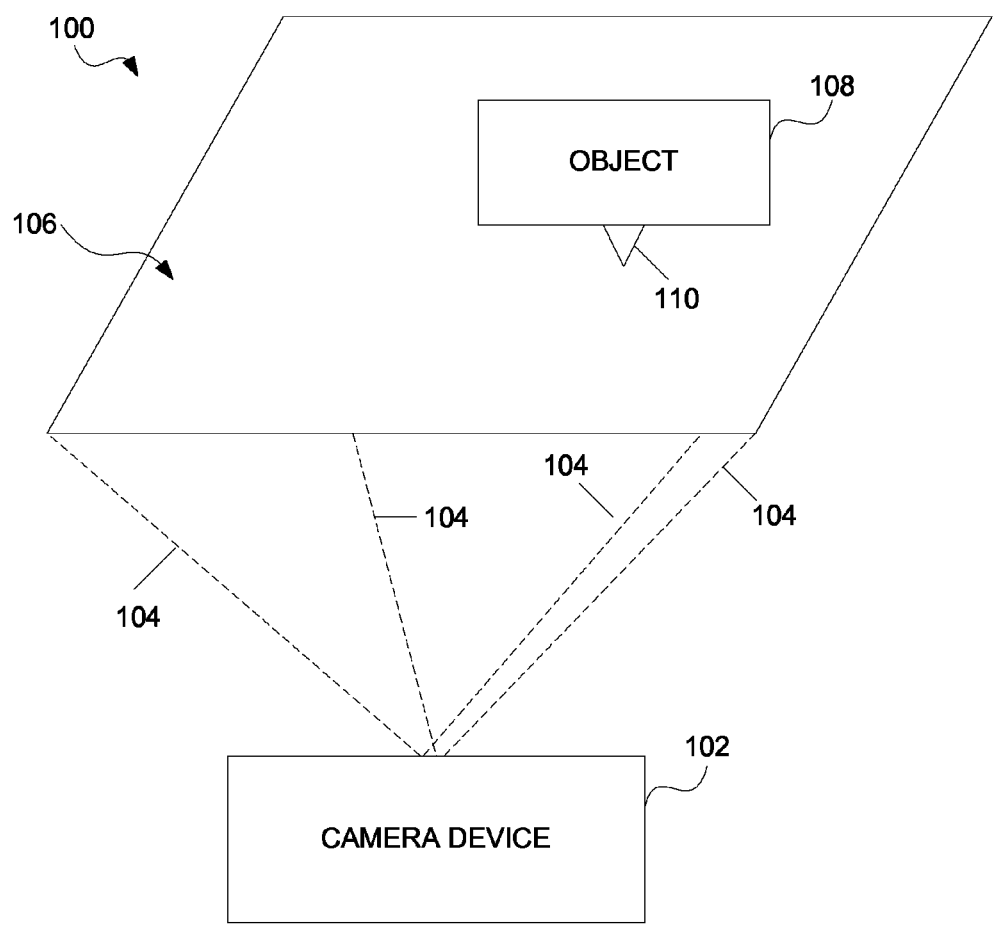
FIG. 1 is a schematic block diagram of one environment in which some embodiments may be practiced.

FIG. 1 is a schematic block diagram of one environment in which some embodiments may be practiced. More specifically, FIG. 1 depicts a computer vision-based object tracking system 100. It should be noted that the present invention is not limited to the computer vision system illustrated in FIG. 1. System 100 is but one example of a suitable environment in which embodiments may be implemented. System 100 is not intended to suggest any limitation as to the scope of use or functionality of various embodiments. Neither should system 100 be interpreted as having any dependency or requirement relating to any one or combination of components illustrated in the exemplary environment.

System 100 includes a camera device 102 that, as is generally indicated by lines 104, has a field of vision focused upon a portion of a surface 106. Those skilled in the art will appreciate that the field of vision can be adjusted through manipulation of imaging components, such as through adjustment of the focus of one or more lenses. Such lenses may or may not be directly incorporated into camera device 102.

In general, camera device 102 is configured to facilitate application of computer vision techniques to support a gathering of data related to the positioning of an object 108. Surface 106 may be transparent such that object 108 is observable by camera device 102 when placed within the associated field of vision. Depending on the technical capacity of camera device 102 (e.g., ability to re-focus or change the field of view, etc.), the ability to track motion of object 108 may be limited to movements wherein object 108 is kept in relatively close proximity to surface 106. However, depending on the technical capacity of camera device 102, it is possible to eliminate surface 106 from the system completely such that the position of object 108 can be tracked at multiple distances from device 102, including various distances other than the distance associated with surface 106.

For any of a variety of reasons, such as to eliminate ambiguity in the object to be tracked, or to simplify the processing task of finding the target object in the image, a light source 110 (e.g., an LED) is added to object 108. Camera device 102 then tracks object 108 by tracking light source 110. In one embodiment, not by limitation, light source 110 is an IR LED and camera device 102 is an IR-sensitive camera. This even further simplifies the tracking of object 108. Of course, surface 106 is assumed to be transparent to the light emitted from light source 110.

The effectiveness of tracking object 108 by tracking light source 110 is at least partially contingent upon the frame acquisition rate supported by camera device 102. For example, if the frame acquisition rate is in the range of 30-60 Hz, then camera device 102 will not likely be able to effectively capture large or quick movements of object 108. Further, if the frame acquisition rate is low, then latency very well may be undesirably high because latency is generally bounded by frame rate.

Applications that might involve large and/or quick movements would benefit from support for higher frame rates. For example, systems designed to track input made upon a screen with an electromagnetic stylus have specified sample collection at 133 Hz to achieve smooth capture of strokes for handwriting recognition, drawing, etc. Other applications such as, but not limited to, music synthesis and video game controllers may also require a relatively high frame acquisition rate.

Camera device 102 is illustratively configured to increase or maximize the frame acquisition rate by exploiting sensor technology that enables specification of an active region of interest (ROI) in the overall image sensing area. In one embodiment, this is accomplished through implementation of Complementary Metal Oxide Semiconductor (CMOS) image sensor technology. CMOS imagers are effectively limited in the bandwidth of the connection link, not the light gathering electronics on the imager itself. Thus, the frame acquisition rate is related to the size of the ROI. A CMOS sensor capable of delivering 30 640×480 frames per second will deliver 4*30=120 frames per second with an ROI of 320×240. By reducing the ROI further, frame rates of several hundred Hz or more are possible.

The described approach raises a few issues to consider. First, because pixels are acquired more quickly than is typically the case, the light integration time for each pixel is relatively reduced. This is akin to reducing the "exposure time" of the camera device. It is possible that for small ROIs, everyday indoor scenes will be too dark to be imaged. Incorporation of an active LEDs into an item to be tracked addresses this issue. The brightness of the LED is apparent even at small ROIs.

Another issue to consider is that a small ROI may require active adjustment such that a tracked object will fall within it. In one embodiment, this issue is addressed by calculating an updated position of the ROI and sending the new ROI to the camera interface. Depending on the technical capacity of a given camera implementation (e.g., a given CMOS imaging system), this may involve a loss of one or more frames. To achieve the highest frame rate, the frequency of changing the ROI can be limited, which may in turn require a larger ROI than if changed every frame.

The present description is focused on one example environment wherein a camera is focused on a surface. In one embodiment, a light source implement is configured with a tip-switch such that the light source is active (e.g., the IR LED is on) only when the switch is on the surface. However, those skilled in the art that the same concepts described herein can similarly be applied within a surface-free environment, such as an environment wherein a light source is waved around in front of a camera for a game or some other purpose.

Figure 2:
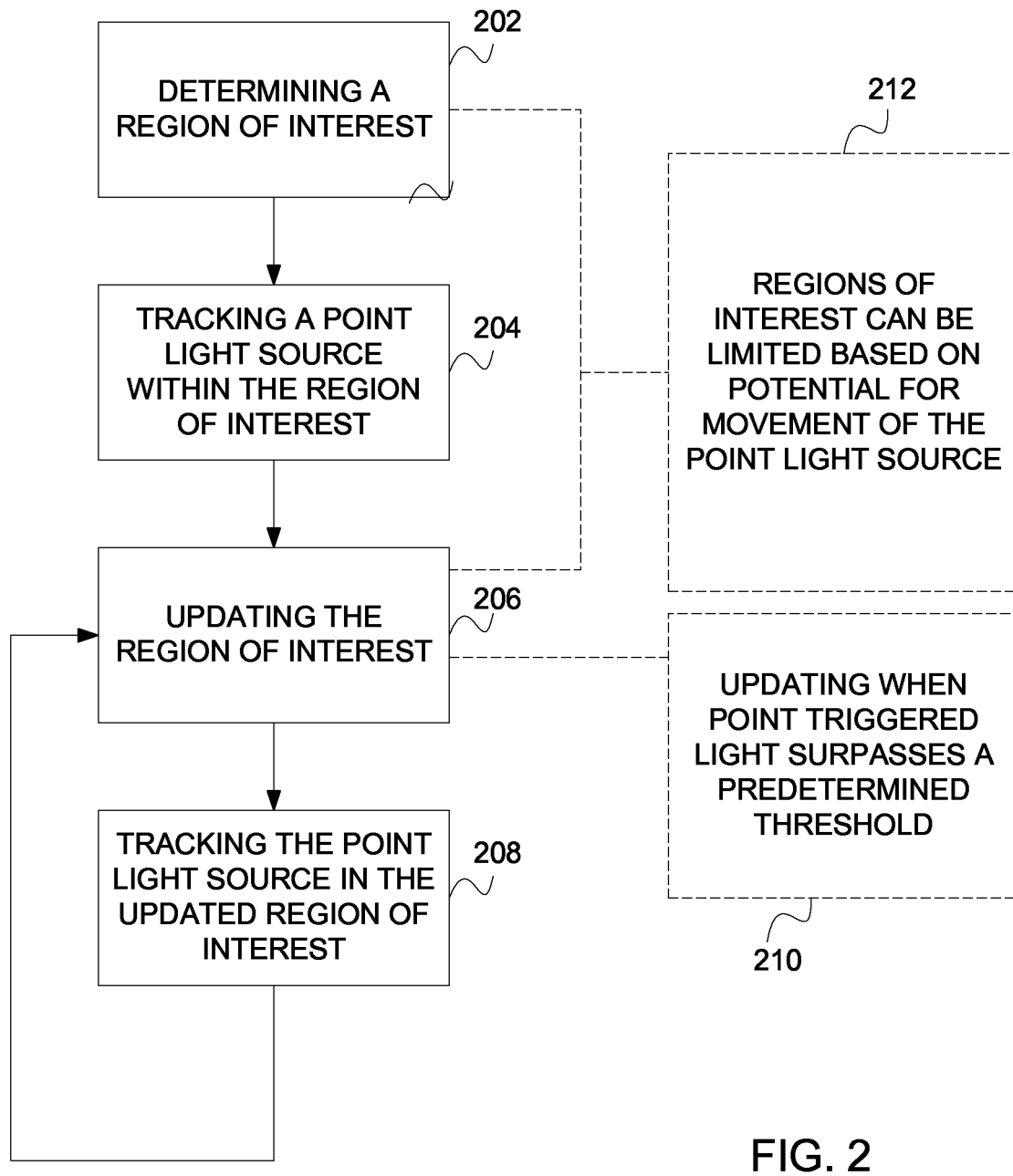
FIG. 2 is a block flow chart illustrating steps associated with tracking a point light source associated with an object.

FIG. 2 is a block flow chart illustrating steps associated with tracking a point light source associated with an object. In accordance with block 202, there is first a determination of an ROI within the overall image sensing area. As is indicated by block 212, the boundaries of the ROI may be based on the potential for movement of the point light source. For example, areas that extend beyond where the light source could move prior to a subsequent re-determination of the region of interest need not be included.

In accordance with block 204, the point light source is tracked within the determined ROI. Block 206 represents an updating or re-determination of the ROI. As noted, the boundaries can again be made contingent on potential for movement. The system can illustratively be configured to perform the re-determination step only under certain circumstances, such as periodically or only when the light source has moved (i.e., if it hasn't moved then re-determination is unnecessary). Further, as is indicated by block 212, re-determination can be made contingent upon movement of the point light source beyond a predetermined threshold. For example, the threshold might be based upon how far movement could potentially occur within a given time period (e.g., a certain number frames, the period between re-determinations of the ROI, etc.). In one embodiment, the region is selected according to a model of the point's motion (e.g., linear motion prediction, Kalman filter, etc.). A better prediction of the point's location supports a smaller ROI and thus a higher frame rate. In accordance with block 208, the updating and tracking steps can be repeated as necessary.

Figure 3:
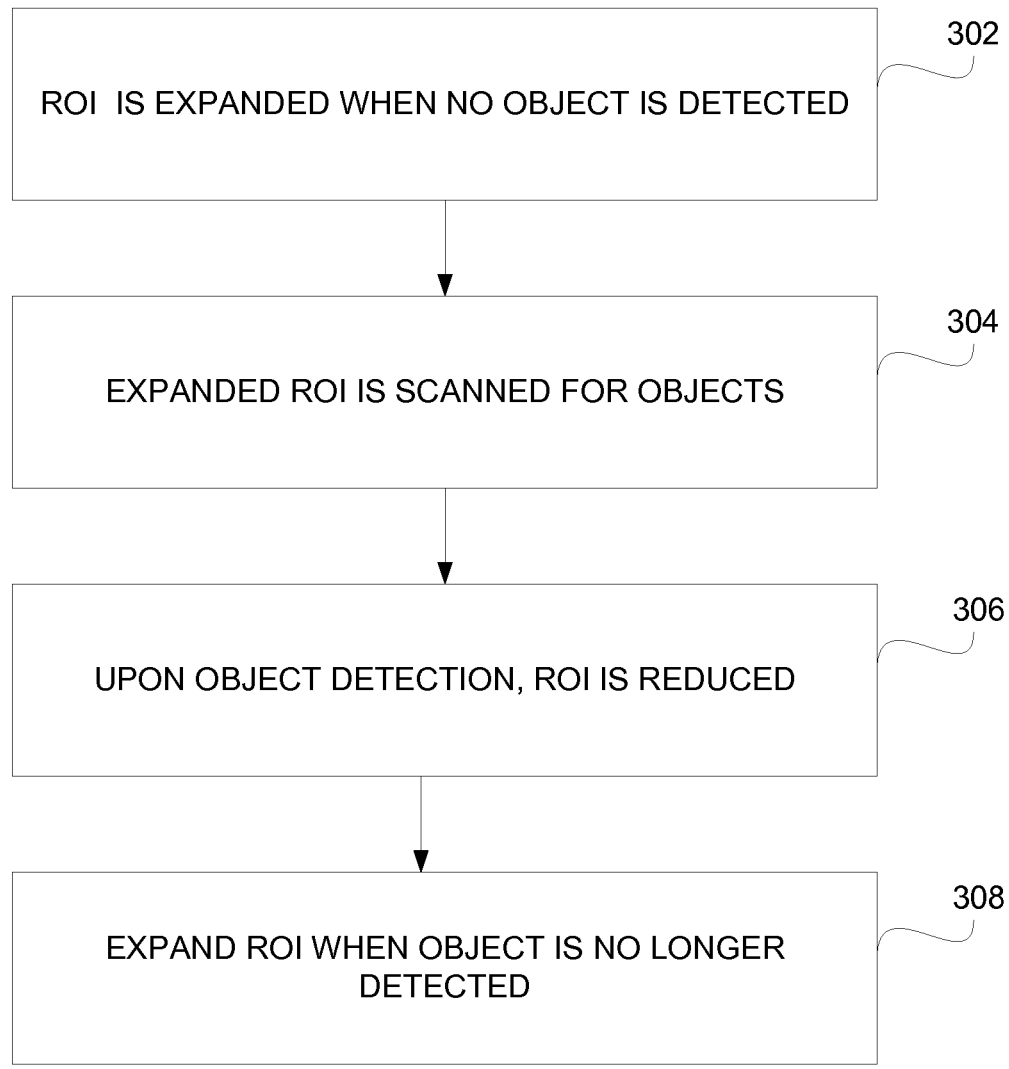
FIG. 3 is a block flow diagram demonstrating steps associated with a process for handling object detection.

It worth pointing out that, with a small ROI, it may be unlikely that the system will detect the appearance of a new object to be tracked. In one embodiment, a specialized algorithm is employed to enhance the system's capacity to detect objects. FIG. 3 is a block flow diagram demonstrating steps associated with a process for handling object detection. In accordance with block 302, when no object (i.e., no point light source) is being actively tracked with a small ROI, then the ROI is enlarged (e.g., to the maximum size). Of course, the frame acquisition rate will correspondingly decrease under the circumstances. In accordance with block 304, expanded ROI is scanned until a new object (i.e., a new point light source) is detected.

In accordance with block 306, upon detection of an object (i.e., the point light source), the ROI is reduced to cover only the object and a corresponding potential range of movement (e.g., the range over which it can move during the small frame time). If, after a time, the object (i.e., the point light source) is not detected in the small ROI, then the system reverts back to the detection phase (e.g., expanded ROI).

Figure 4:
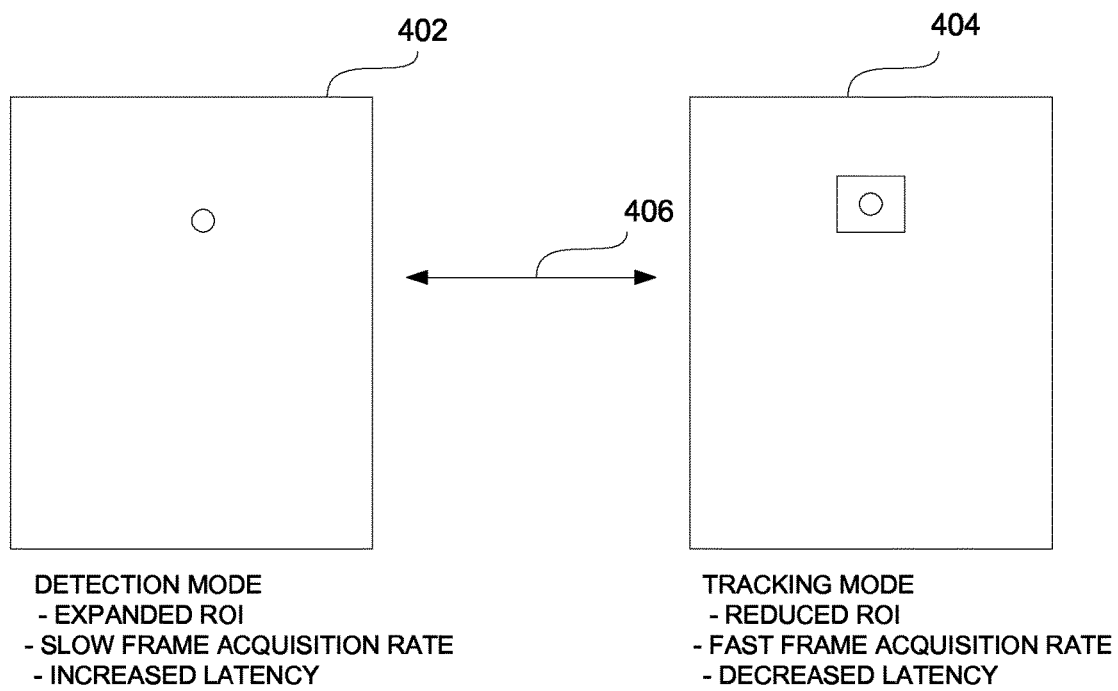
FIG. 4 is a schematic representation visually demonstrating a process for object detection.

FIG. 4 is a schematic representation visually demonstrating a process for object detection. In a detection mode 402, the ROI is expanded, the frame acquisition rate is relatively slow and latency is increased. This is assumedly prior to detection of a point light source associated with an object. Upon detection, the system transitions into tracking mode 404, wherein the ROI is reduced, the frame acquisition rate is increased and latency is reduced. As has been described, in the tracking mode, the ROI is illustratively adjusted to accommodate movement of the object. Arrow 406 demonstrates that the system can switch between the detection mode and tracking mode as necessary.

As an example of a specific implementation, methods such as those described are employed to track the positioning of an active IR LED built into a stylus. Samples are collected at a frame acquisition rate measured in hundreds of HZ (e.g., more than 400 HZ). Thus, the stylus can be used effectively in an inking application. Furthermore, "sub-pixel" tracking techniques can be employed to further improve the quality of the inking functionality. This can be achieved, for example, by calculating the position of the LED as the weighted average of the position of the bright pixels in the ROI, where each weight is the brightness of the pixel.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A vision-based gaming system comprising:
    an optical device configured to receive light from a light source associated with a user game controller; and
    a computing device configured to:
        track movement of the user game controller within an image sensing area based on the light received from the light source, wherein the optical device has a variable field of vision such that the computing device is configured to track movement of the light source at multiple different distances from the optical device, wherein the variable field of vision is variable between a first field of vision and a second field of vision that has a larger area than the first field of vision; and adjust an acquisition rate of frames from the optical device, wherein the acquisition rate is proportional to a resolution of the images from the optical device.

2. The vision-based gaming system of claim 1, wherein the user game controller comprises a handheld device having one or more user input controls.

3. The vision-based gaming system of claim 1, further comprising an interface for communicatively coupling the optical device to a processor of the vision-based gaming system.

4. The vision-based gaming system of claim 1, wherein the optical device comprises a camera.

5. The vision-based gaming system of claim 4, wherein the camera comprises a CMOS image sensor.

6. The vision-based gaming system of claim 1, wherein the light source is configured to produce the light received by the optical device.

7. The vision-based gaming system of claim 6, wherein the light source comprises a light emitting diode (LED).

8. The vision-based gaming system of claim 1, wherein the optical device is configured to detect infrared (IR) light emitted from the light source.

9. The vision-based gaming system of claim 1, wherein the computing device is configured to:

determine a boundary of a region of interest within the image sensing area based at least in part upon a potential range of movement of the point light source, wherein the boundary of the region of interest defines an area that is less than the image sensing area.

10. The vision-based gaming system of claim 9, wherein the computing device is configured to:

determine the potential range of movement of the point light source based on a location of the tracked movement and a given time period for potential movement of the point light source.

11. The vision-based gaming system of claim 10, wherein the computing device is configured to re-determine the boundary of the region of interest when the light source moves to a location that is beyond a predetermined threshold, and wherein the predetermined threshold is based upon a number of frames.

12. The vision-based gaming system of claim 10, wherein the computing device is configured to:

determine that the light source is not detected within the boundary of the region of interest and in response, adjust the boundary to increase the size of the region of interest.

13. The vision-based gaming system of claim 1, wherein the optical device comprises an imaging component that is adjustable to vary the field of vision of the optical device from the first field of vision to the second field of vision.

14. The vision-based gaining system of claim 13, wherein the imaging component comprises at least one lens and varying the field of vision comprises adjusting the focus of the at least one lens.

15. The vision-based gaming system of claim 13, wherein the imaging component is adjusted automatically by sending an instruction through an interface that communicatively couples the optical device and a gaining console.

16. A computer-implemented method in a vision-based gaming system, the method comprising:

receiving a first signal from an optical device in the vision-based gaming system, the first signal being indicative of the optical device receiving, with a first field of vision, light from a light source that is associated with a user game controller such that the light source moves as the user game controller moves, wherein the optical device is configured to track the light source at multiple different distances from the optical device;

determining a first movement of the user game controller based on the first signal;

receiving a second signal from the optical device, the second signal being indicative of the optical device receiving, with a second field of vision that defines a larger spatial area than the first field of vision, light from the light source to; and determining a second movement of the user game controller based on the second signal;

wherein an acquisition rate of frames from the optical device is adjustable, and the acquisition rate is proportional to a resolution of the images from the optical device.

17. The computer-implemented method of claim 16, wherein the user game controller comprises a handheld device having one or more user input controls.

18. The computer-implemented method of claim 16, wherein the optical device comprises a camera.

19. The computer-implemented method of claim 16, wherein the light source is configured to produce the light received by the optical device.

20. The computer-implemented method of claim 19, wherein the light source comprises a light emitting diode (LED).

* * * * *